(12) United States Patent
Doerr

(10) Patent No.: US 6,219,471 B1
(45) Date of Patent: Apr. 17, 2001

(54) OPTICAL DEVICE HAVING EQUAL LENGTH WAVEGUIDE PATHS

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/232,109

(22) Filed: Jan. 15, 1999

(51) Int. Cl.$^7$ .................................................. G02B 6/122
(52) U.S. Cl. .............................. 385/15; 385/39; 385/46; 385/129
(58) Field of Search .................................. 385/15, 14, 32, 385/39, 46, 129–132

(56) References Cited

U.S. PATENT DOCUMENTS

| | | | |
|---|---|---|---|
| 5,212,758 | 5/1993 | Adar et al. | 385/129 |
| 5,611,007 | * 3/1997 | Wolf et al. | 385/14 |
| 5,822,481 | 10/1998 | Mestric | 385/46 |
| 5,838,844 | * 11/1998 | Van Dam et al. | 385/14 |

FOREIGN PATENT DOCUMENTS

| | | | |
|---|---|---|---|
| 0 823 647 | 2/1998 | (EP) | G02B/6/34 |

OTHER PUBLICATIONS

M. K. Smit, "New focusing and dispersive planar component based on an optical phased array," *Electronics Letters*, 24, No. 7, pp. 385–386 (1998).(Mar.).

C. Dragone, "An NxN Optical Multiplexer Using a Planar Arrangement of Two Star Couplers," *IEEE Photonics Technology Letters*, 3, 812–814 (1991).(Sep.).

K. Okamoto et al., "16–channel optical add/drop multiplexer consisting of arrayed–waveguide gratings and double–gate switches," *Electronics Letters*, 32, 1471–1472 (1996). (Aug.).

C. R. Doerr, "Proposed WDM Cross Connect Using a Planar Arrangement of Waveguide Grating Routers and Phase Shifters," *IEEE Photonics Technology Letters*, 10, No. 4, pp. 528–530 (1998). (Apr.).

C. R. Doerr, "Proposed Optical Cross Connect Using a Planar Arrangement of Beam Steerers," *IEEE Photonics Technology Letters*, 11, No. 2, pp. 197–199 (1999). (Feb.).

C. R. Doerr et al., "Integrated WDM Dynamic Power Equalizer with Potentially Low Insertion Loss," *IEEE Photonics Technology Letters*, 10, pp. 1443–1445 (1998). (Oct.).

* cited by examiner

Primary Examiner—Rodney Bovernick
Assistant Examiner—Michael J Stahl
(74) Attorney, Agent, or Firm—J. J. Brosemer

(57) ABSTRACT

An optical device having an array of substantially equal-length optical waveguides. Each one of the optical waveguides includes one or more straight segments, one or more curved segments, and optionally, one or more transition segments. According to the invention, the sum of the lengths of the straight segments in each of the waveguides is substantially equal. Similarly, the sum of the lengths of the curved segments in each of the waveguides may be substantially equal as well. Finally, the sum of the lengths of optional transition segments in each of the waveguides may also be substantially equal. Advantageously, the device exhibits relative lengths that are robust to fabrication errors and have low polarization sensitivity.

10 Claims, 4 Drawing Sheets

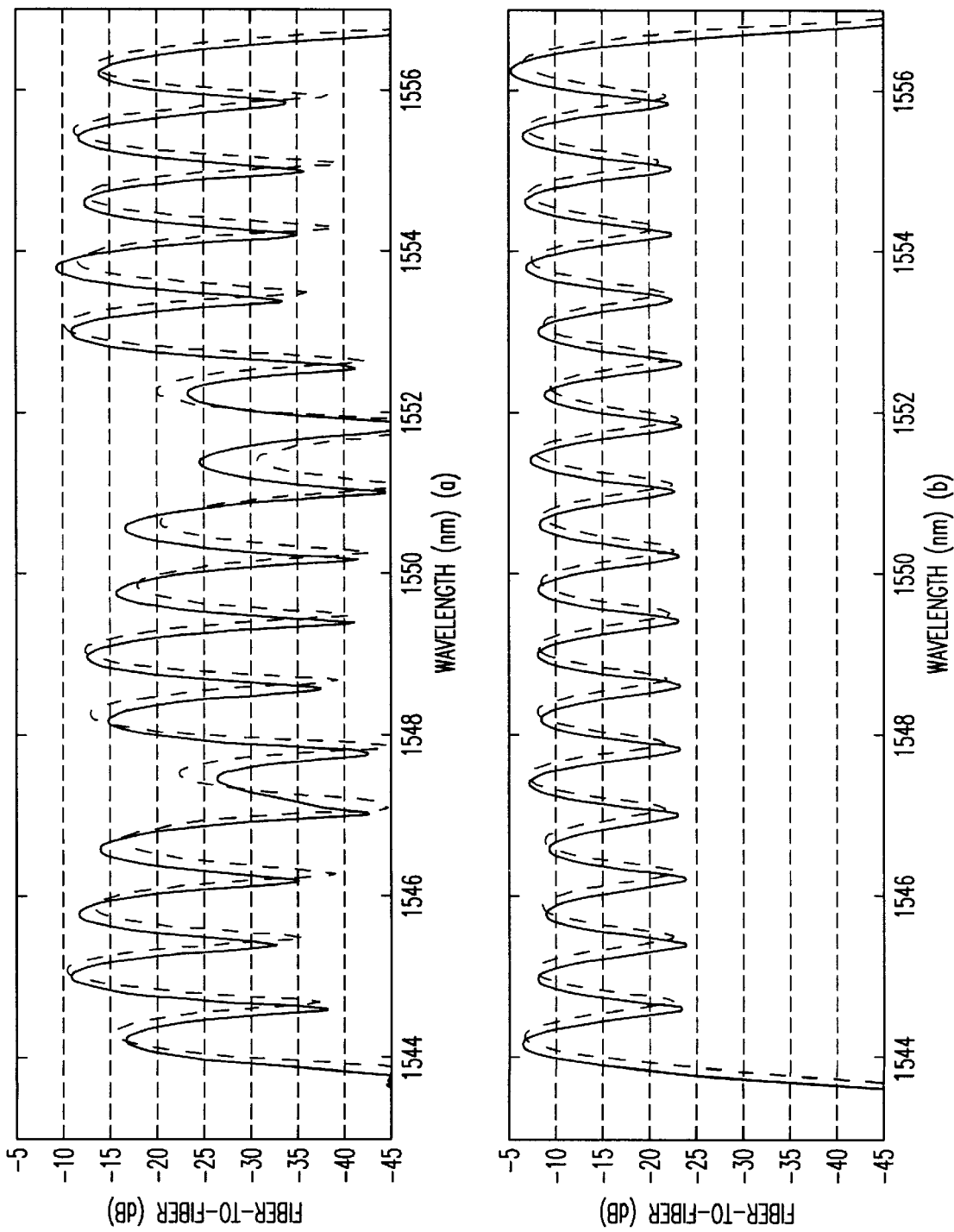

OPTICAL DEVICE HAVING EQUAL LENGTH WAVEGUIDE PATHS

FIELD OF THE INVENTION

This invention relates to optical devices and, more particularly, to an optical device having equal-length waveguide path*, exhibiting greater fabrication tolerance and reduced polarization sensitivity.

BACKGROUND OF THE INVENTION

A Wavelength-Division-Multiplexin, (WDM) cross-connect (a non-wavelength-changing one) is a device that can exchange any wavelength channel in any line with the same wavelength channel in any other line. The conventional design is to use a matrix of switches between sets of wavelength multiplexers, such as Waveguide Grating Routers (WGRs). For example see the publications

[1] M. K. Smit, "New focusing and dispersive planar component based on an optical phased array," Electron. Lett., vol. 24, pp. 385–386 (1988);

[2] H. Takahashi, S. Suzuki, K. Kato and I. Nishi, "Arrayed-waveguide grating for wavelength division multi/demultiplexer with nanometer resolution," Electron. Lett., vol. 26, pp. 87–88 (1990); and

[3] C. Dragone, "An N×N optical multiplexer using a planar arrangement of two star couplers," *IEEE Photon. Technol. Lett.*, vol. 3, 812–814 (1991); each of which are incorporated herein by reference.

For 2 line×2 line versions, designs have been demonstrated with discrete components {e.g., see B. Glance, "Tunable add drop optical filter providing arbitrary channel arrangements," *IEEE Photon. Technol. Lett.*, vol. 7, 1303–1305 (1995)} which is incorporated herein by reference, and with fully integrated components {e.g., see K. Okamoto, M. Okuno, A. Himeno, and Y. Ohmori, "16-channel optical add/drop multiplexer consisting of arrayed-waveguide gratings and double-gate switches," *Electron. Lett.*, vol. 32, 1471–1472 (1996)}, also incorporated herein by reference.

Referring to the drawing, FIG. 1. is a top view of a prior-art waveguide array multiplexer 10 comprising a first array coupler 11 coupled via an array of n waveguides $W_1$, $W_2, \ldots, W_n$ to a second array coupler 12. The array couplers 11 and 12 may be slab waveguide regions with a plurality of peripherally distributed waveguides. In one mode of operation, coupler 11 receives light at $P_i$ from an input waveguide 13, and coupler 12 distributes received light to a pair of output waveguides 14 and 15 near $P_0$. The array of n waveguides between couplers 11 and 12 are arrayed in a "C" configuration with the waveguides spreading apart away from the couplers in order to reduce crosstalk. Each successive waveguide provides an optical path that is longer than its predecessor by a constant amount $\Delta l$.

In operation, light in the fundamental mode of input waveguide 13 spreads by diffraction from the center of coupler 11, forming a circular wavefront of constant phase. The waveguides around the circumference of coupler 11 are all excited with the same phase. Since the waveguides separate, the optical signals become decoupled. After decoupling, however, the light in the waveguides initially continues with a circular phase front and retains nearly the same amplitude distribution as when the waveguides were initially excited.

The array is designed such that each successive waveguide has an increased length $\Delta l$ compared to its lower neighbor, and the waveguides terminate in a converging circle at coupler 12. If $\Delta l = m\lambda_o$, where $\lambda_o$ is the wavelength in the medium and m is an integer order number, then the phase front of the light in coupler 12 forms a circular wave converging on the coupler axis at $P_o$. At a different wavelength $\lambda_o + \Delta\lambda$, the phase front emerging from the array will be tilted at a small angle $\theta$, relative to the coupler axis CC' and will couple efficiently near $P_o$ to waveguide 15 which is angularly displaced by $\theta$ from the coupler axis. In this example, output waveguide 14 is positioned to couple to $\lambda_o$ and output waveguide 15 to $\lambda_o + \Delta\lambda$. This device can thus be used to receive a two wavelength input from waveguide 13 ($\lambda_o$ and $\lambda_o + \Delta\lambda$) and provide wavelength separated outputs $\lambda_o$ at 14 and $\lambda_o + \Delta\lambda$ at 15. The device thus acts as a grating and a demultiplexer. In the reverse direction, it can act as a multiplexer.

Many lightwave devices require an array of two or more waveguide paths of substantially equal length, such as dynamic wavelength equalizers disclosed by C. R. Doerr, in an article entitled "Proposed optical cross connect using a planar arrangement of waveguide grating routers and phase shifters," that appeared in IEEE Photon. Technol. Lett., vol. 10, pp. 528–530, 1998 (hereinafter the "Doerr Optical Cross Connect Article"); the wavelength cross connects disclosed by C. R. Doerr and C. Dragone, in another article entitled "Proposed optical cross connect using a planar arrangement of beam steerers," to appear in IEEE Photon. Technol. Lett., vol. 11, February, 1999; and optical cross connects such as that disclosed by C. R. Doerr, C. H. Joyner, and L. W. Stulz, in an article entitled "Integrated WDM dynamic power equalizer with potentially low insertion loss," IEEE Photon. Technol. Lett., vol. 10, pp. 1443–1445, 1998, all incorporated herein by reference.

FIG. 2 shows a schematic of a prior art device disclosed in U.S. Pat. No. 5,212,758 issued to Adar et al on May 18, 1993 for a "Planar Lens and Low Order Array Multiplexer", and incorporated herein by reference in its entirety. The device shown in FIG. 2. is similar to that of FIG. 1 except that the n waveguides ($W_1, W_2, \ldots, W_n$) between array couplers 21 and 22 are arrayed in an "S" configuration rather than a "C" configuration. Specifically, each waveguide comprises two substantially circular arcs which reverse direction of curvature at AA' half way between the couplers 21 and 22. Such "S" configurations have shown to be effective for making broadband multiplexers or planar lenses.

Notwithstanding these advances, there is a continuing need for optical devices that facilitate the transmission and management of optical signals.

SUMMARY OF THE INVENTION

I have invented an optical device having an array of substantially equal-length optical waveguides. Each one of the optical waveguides includes one or more straight sections, one or more curved sections, and optionally, one or more transition sections. Unlike the prior art and according to my invention, a total straight section length will be substantially the same for all of the waveguides in the array. Similarly, a total curved section length may be substantially the same for all of the waveguides as well.

BRIEF DESCRIPTION OF THE DRAWINGS

In the drawing,

FIG. 6 (a) is a graph showing a spectral response at various wavelengths for an arrayed waveguide constructed according to prior art teachings of the Doerr Optical Cross Connect Article in which total straight segment length is not constant and (b) constructed according to the present teachings wherein total straight segment lengths are constant across all of the individual waveguides.

DETAILED DESCRIPTION

Figure 1:
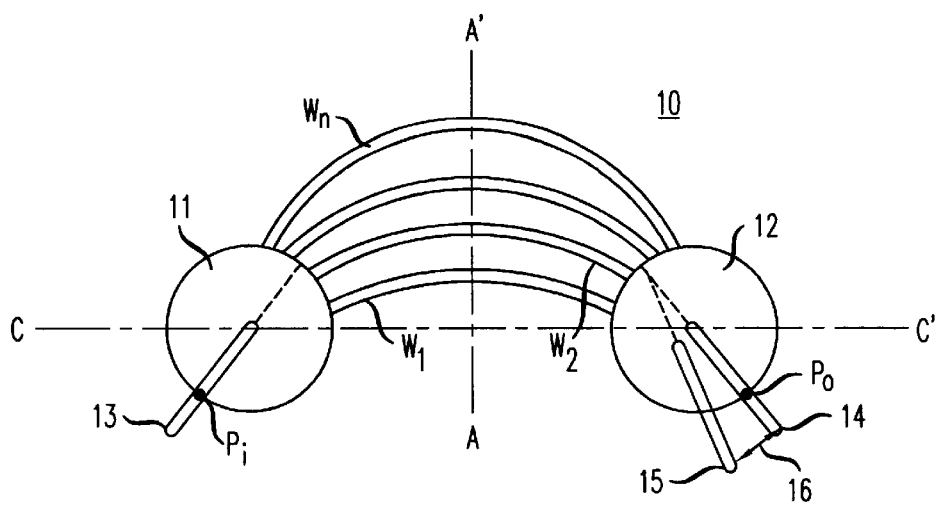
FIG. 1 is a schematic view of a prior art waveguide array multiplexer having "C" shaped optical waveguides of unequal length.
Figure 2:
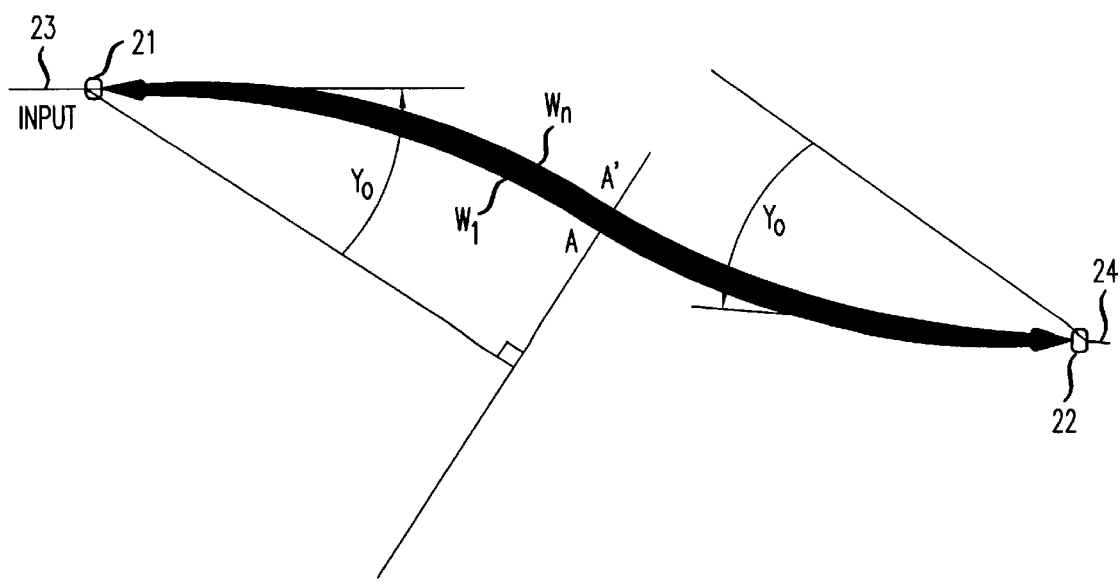
FIG. 2 shows an illustrative prior art "S" shaped optical waveguide useful in optical devices having equal length waveguides.

By way of further background, the fact that the "S" configuration of waveguides can be designed to provide substantially equal path lengths from 21 to 22 can be seen from FIG. 1 by considering a line of symmetry AA' perpendicular to the line $P_o P_i$ in the "C" configuration device. In the FIG. 1 device, the relationship between waveguide and pathlength is given by:

$$W_1 = l, W_2 = l + \Delta l, W_3 = l + 2\Delta l, \ldots, W_n = l + (n-1)\Delta l.$$

Now, if we consider an "S" configuration structure formed by cutting across AA' and axially rotating the structure by 180° so that the left half of $W_1$ is connected to the right half of $W_n$, the left half of $W_2$ is connected to the right half of $W_{n-1}$, etc. Consequently, the total path length for each waveguide is the same and may be described as $l+((n-1)\Delta l/2)$.

Figure 3:
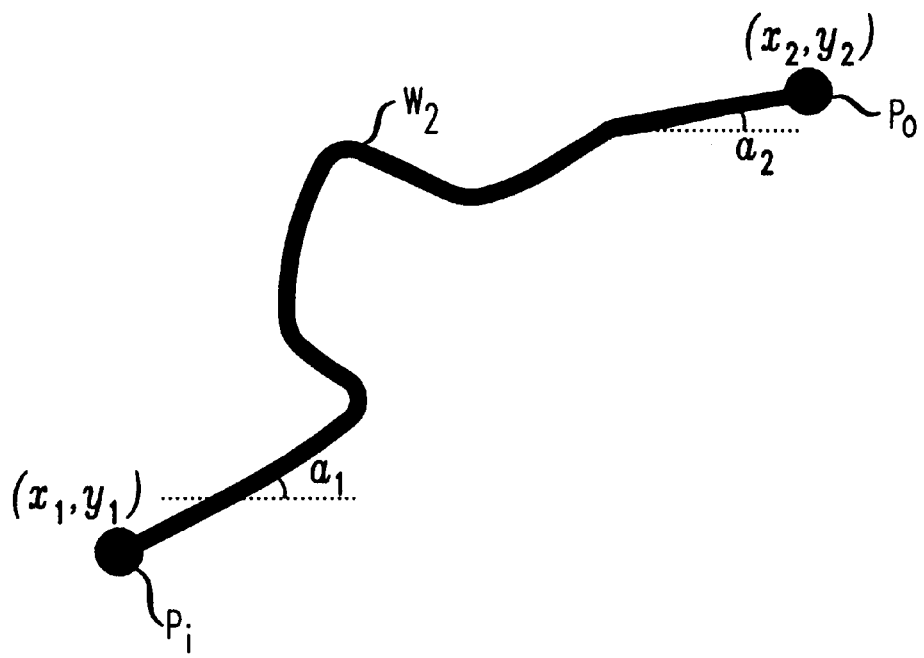
FIG. 3 shows an "S" shaped optical waveguide connecting a pair of points.

With reference now to FIG. 3, there is shown a generalized waveguide $W_g$ having two endpoints $P_i$ and $P_o$. In the general case, each waveguide path m must start at a specified point $[x_1(m), y_1(m)]$, where x and y are Cartesian coordinates, at a specified angle $\alpha_1(m)$ and must end at another specified point $[x_2(m), y_2(m)]$ at another specified angle $\alpha_2(m)$. As can be appreciated, there are an infinite number of waveguide paths possible to effect optical connections between $P_i$ and $P_o$, such as the method described in the aforementioned U.S. Pat. No. 5,212,758. Unlike this prior art method, however, my inventive method and apparatus defines the waveguide paths such that the relative length of each path is fabrication tolerant and polarization insensitive.

My inventive apparatus may be summarized as follows. Each path (waveguide) may include a number of straight segments, i.e., 3; a number of curved segments, i.e., 2, and, optionally, one or more transition segments. Generally speaking, a straight segment has a substantially straight central axis and a curved segment has a central axis that is uniformly curved around a point resulting in a substantially constant radius of curvature. In a particular embodiment in which a number of equal-length waveguides optically connect two endpoints, the straight segments of the waveguides may all have the same width; the curved segments of the waveguides may all have the same bend radius, width, and radial offset; and the transition segments may all be the same for all the waveguide paths. Importantly, the sum of the straight segment lengths is substantially the same for each of the waveguides, and likewise substantially the same for the sum of the curved segment lengths and substantially the same for the sum of the transition segment lengths.

Figure 4:
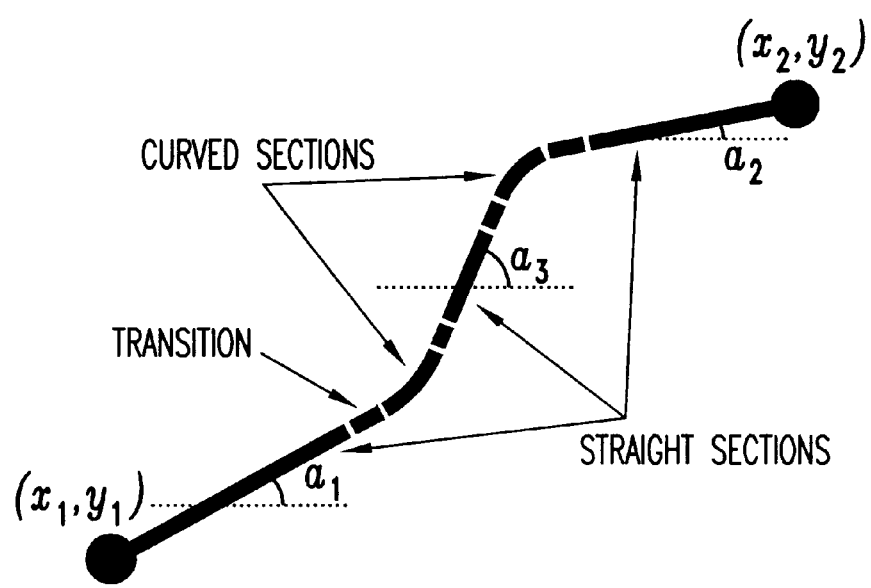
FIG. 4 shows an "S" shaped optical waveguide according to the present invention.

FIG. 4. shows a schematic of an exemplary optical waveguide constructed according to my teachings. Specifically, the optical waveguide optically connects two endpoints $(x_1, y_1)$, and $(x_2, y_2)$. As shown in this Figure, the waveguide has a number of straight segments (3 in this example) and a number of curved segments (2 in this example) and, optionally, one or more transition segments interposed between the curved segments and the straight segments. Not explicitly shown in this Figure, but that which can be readily appreciated by those skilled in the art, such an optical waveguide would have a central axis through which optical signals may propagate. As noted earlier, straight segments exhibit a substantially straight central axis and curved segments exhibit a central axis having a constant radius of curvature.

These characteristics may be achieved by making the angle of the center straight segment $\alpha_3(m)$ substantially equal to:

$$\alpha_3(m) = \frac{\alpha_1(m) + \alpha_2(m)}{2} + c_1;$$

and the lengths of the 3 straight segments, $l_1(m)$, $l_2(m)$, and $l_3(m)$ substantially equal to:

$$\begin{bmatrix} l_1(m) \\ l_2(m) \\ l_3(m) \end{bmatrix} = \begin{bmatrix} 1 & 1 & 1 \\ \cos\alpha_1(m) & \cos\alpha_2(m) & \cos\alpha_3(m) \\ \sin\alpha_1(m) & \sin\alpha_2(m) & \sin\alpha_3(m) \end{bmatrix}^{-1} \times \begin{bmatrix} c_2 \\ x_2(m) - x_1(m) - f_x[\alpha_1(m), \alpha_3(m), h_1] - f_x[\alpha_3(m), \alpha_2(m), h_2] \\ y_2(m) - y_1(m) - f_y[\alpha_1(m), \alpha_3(m), h_1] - f_y[\alpha_3(m), \alpha_2(m), h_2] \end{bmatrix};$$

where $c_1$ and $c_2$ are constants, which do not change for all waveguides in the array. Additionally, $f_x$ and $f_y$ are functions that give the x- and y-displacements of the curves and transition sections given the starting angle, stopping angle, and the curve handedness (i.e., clockwise or counterclockwise) h.

Figure 5:
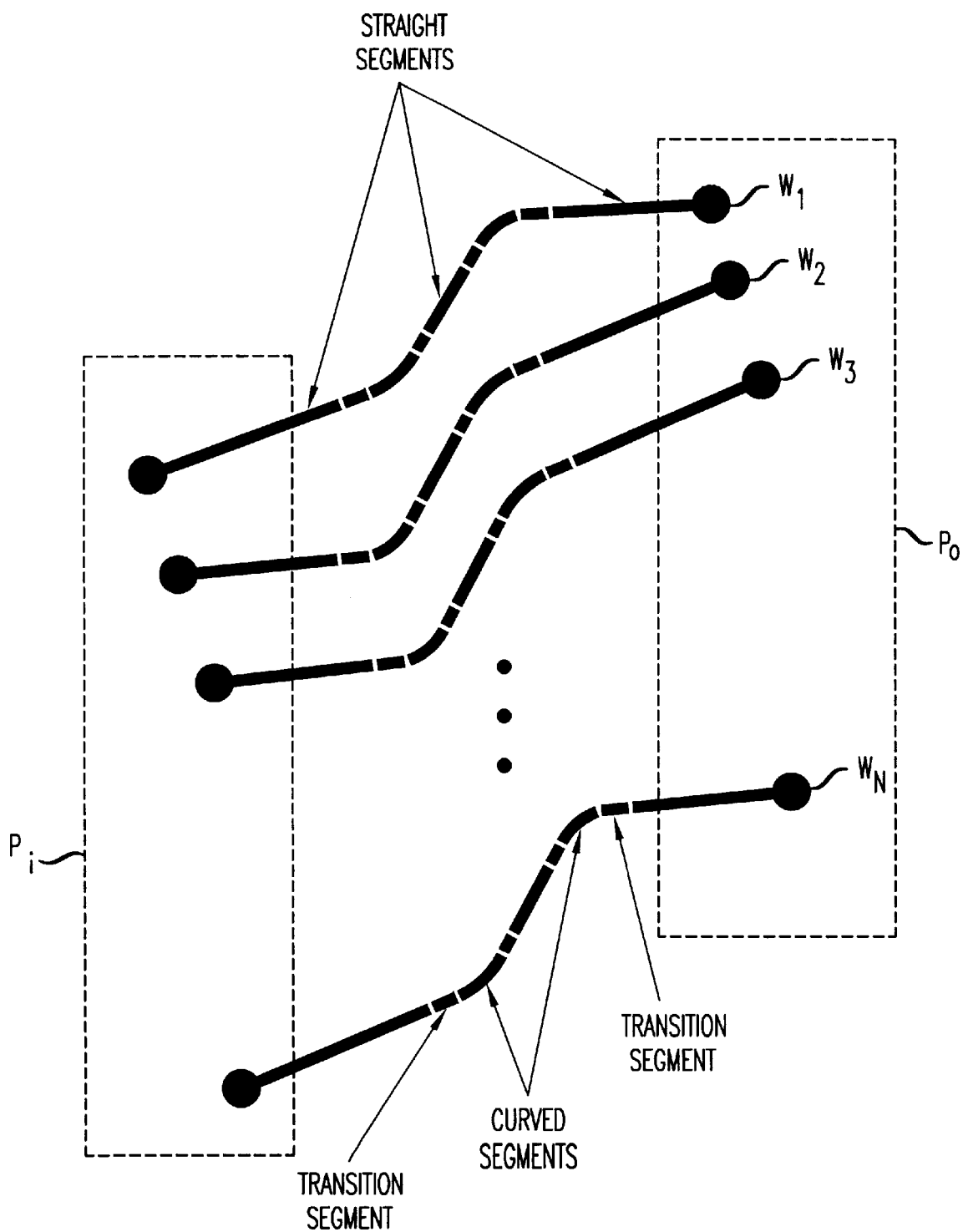
FIG. 5 is a schematic view of a device having an array of "S" shaped optical waveguides according to the present invention.

FIG. 5 is a schematic of an optical device including an array of substantially equal length waveguides according to my invention. Specifically, and with reference now to that Figure, an array of waveguides $W_1$, $W_2$, $W_3$, . . . $W_n$, are shown connecting an input coupler $P_i$ with an output coupler, $P_o$. As should be noted, the waveguides need not originate or terminate at the same coupler(s) as depicted in this Figure for simplicity.

Each of the waveguides, $W_1$, $W_2$, $W_3$, . . . $W_n$, are substantially the same total length, and each include a plurality of straight segments, a plurality of curved segments, and, optionally, one or more transition segments. As noted before, the total length of the straight segments for an individual waveguide, i.e., $W_1$, will be substantially the same for any of the other waveguides, i.e., $W_n$. Similarly, the total length of the curved segments for an individual waveguide, i.e., $W_1$, will be substantially the same for any of the other waveguides, i.e., $W_n$. Finally, if transition segments are present, the total length of the transition segments for an individual waveguide, i.e., $W_1$, will be substantially the same for any of the other waveguides, i.e., $W_n$.

FIG. 6. shows the spectral response through a wavelength cross connect as described in the Doerr Optical Cross Connect Article made in silica waveguides wherein FIG. 6(a) connecting waveguide paths between waveguide grating routers are designed to have equal lengths but the sum of the straight segment length are NOT equal for each path, while in FIG. 6(b), they are. When all of the path lengths are equal in an actual device, all of the passbands should exhibit the same height. However, if the actual path lengths are more than approximately 0.001% in error, relative to each other, the passband heights will exhibit significant variation. Advantageously, and as one can see from FIG. 6(b), the present invention causes the actual waveguide path lengths to be nearly identical in a real device.

My method gives fabrication tolerant relative path lengths because in the fabrication of planar lightwave circuit waveguides, it is difficult to achieve a precise waveguide width. However, any waveguide width inaccuracy is usually the same for all of the waveguides. A change in waveguide width changes the effective index of the waveguide, changing its effective path length; and this effect is different for straight sections and curved sections. However, since the total straight length and total curved length are independently the same for each waveguide path in the array, the total path lengths will remain equal despite fabrication waveguide width inaccuracies. This method gives also polarization-independent relative path lengths because, again, the total straight length and total curved length are the same for each waveguide path in the array. Because the birefringences of the straight and curved sections are different, other methods may give rise to a polarization dependence in the path-length difference between the waveguide paths.

What has been described is merely illustrative of the application of the principles of the present invention. Other arrangements and methods can be implemented by those skilled in the art without departing from the spirit and scope of the present invention which should be limited solely by the claims appended hereto.

The invention claimed is:

1. An optical device comprising an array of substantially equal-length optical waveguides CHARACTERIZED IN THAT:
    each one of the optical waveguides has a plurality of straight segments, a plurality of curved segments and a plurality of transition segments wherein the sum of the lengths of the transition segments in each of the waveguides is substantially equal, the sum of the lengths of the straight segments in each of the waveguides is substantially equal, and the sum of the lengths of the curved segments in each of the waveguides is substantially equal.

2. The optical device of claim 1 wherein each of the straight segments has substantially the same width.

3. The optical device of claim 1 wherein each of the curved segments has substantially the same bend radius, width and radial offset.

4. An optical device comprising:
    an input coupling;
    an array of substantially equal-length optical waveguides optically coupled to the input coupling, each optical waveguide including:
        at least three (3) straight segments; and
        at least two (2) curved segments interposed between the straight segments;
    wherein the sum of the lengths of the straight segments in each of the waveguides is substantially equal.

5. The optical device of claim 4 in which each optical waveguide includes:
    a plurality of transition segments interposed between the straight segments and the curved segments.

6. The optical device of claim 4 in which the sum of the lengths of the curved segments in each of the waveguides is substantially equal.

7. The optical device of claim 6 wherein each of the straight segments have substantially the same width.

8. The optical device of claim 7 wherein each of the curved segments have substantially the same bend radius, width and radial offset.

9. The optical device of claim 4 in which each of the waveguides m starts at a point $[x_1(m), y_1(m)]$, where x and y are Cartesian coordinates, at a starting specified angle $\alpha_1(m)$ and ends at another specified point $[x_2(m), y_2(m)]$ at an ending specified angle $\alpha_2(m)$, wherein an angle of the center straight segment $\alpha_3(m)$ is substantially equal to:

$$\alpha_3(m) = \frac{\alpha_1(m) + \alpha_2(m)}{2} + c_1;$$

and the lengths of 3 straight segments, $l_1(m)$, $l_2(m)$, and $l_3(m)$ substantially equal to:

$$\begin{bmatrix} l_1(m) \\ l_2(m) \\ l_3(m) \end{bmatrix} = \begin{bmatrix} 1 & 1 & 1 \\ \cos\alpha_1(m) & \cos\alpha_2(m) & \cos\alpha_3(m) \\ \sin\alpha_1(m) & \sin\alpha_2(m) & \sin\alpha_3(m) \end{bmatrix}^{-1} \times \begin{bmatrix} c_2 \\ x_2(m) - x_1(m) - f_x[\alpha_1(m), \alpha_3(m), h_1] - f_x[\alpha_3(m), \alpha_2(m), h_2] \\ y_2(m) - y_1(m) - f_y[\alpha_1(m), \alpha_3(m), h_1] - f_y[\alpha_3(m), \alpha_2(m), h_2] \end{bmatrix};$$

where $c_1$ and $c_2$ are constants, $f_x$ and $f_y$ are functions that give the x- and y-displacements of the curves given the starting specified angle, ending specified angle, and a curve handedness (i.e., clockwise or counterclockwise) h.

10. The optical device of claim 5 in which each of the waveguides m starts at a point $[x_1(m), y_1(m)]$, where x and y are Cartesian coordinates, at a starting specified angle $\alpha_1(m)$ and ends at another specified point $[x_2(m), y_2(m)]$ at an ending specified angle $\alpha_2(m)$, wherein an angle of the center straight segment $\alpha_3(m)$ is substantially equal to:

$$\alpha_3(m) = \frac{\alpha_1(m) + \alpha_2(m)}{2} + c_1;$$

and the lengths of 3 straight segments, $l_1(m)$, $l_2(m)$, and $l_3(m)$ substantially equal to:

$$\begin{bmatrix} l_1(m) \\ l_2(m) \\ l_3(m) \end{bmatrix} = \begin{bmatrix} 1 & 1 & 1 \\ \cos\alpha_1(m) & \cos\alpha_2(m) & \cos\alpha_3(m) \\ \sin\alpha_1(m) & \sin\alpha_2(m) & \sin\alpha_3(m) \end{bmatrix}^{-1} \times$$
$$\begin{bmatrix} c_2 \\ x_2(m) - x_1(m) - f_x[\alpha_1(m), \alpha_3(m), h_1] - f_x[\alpha_3(m), \alpha_2(m), h_2] \\ y_2(m) - y_1(m) - f_y[\alpha_1(m), \alpha_3(m), h_1] - f_y[\alpha_3(m), \alpha_2(m), h_2] \end{bmatrix};$$

where $c_1$ and $c_2$ are constants, $f_x$ and $f_y$ are functions that give the x- and y-displacements of the curves and transition sections given the starting specified angle, ending specified angle, and a curve handedness (i.e., clockwise or counterclockwise) h.

\* \* \* \* \*